July 21, 1931.  R. W. BROWN  1,815,611
NONJAMMING TAPER SHANK TOOL
Filed Jan. 30, 1929
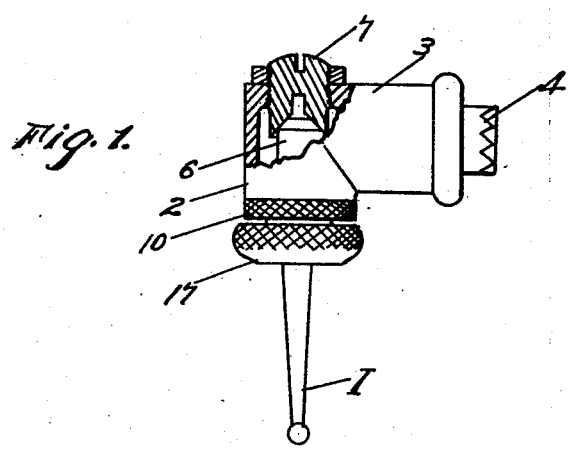
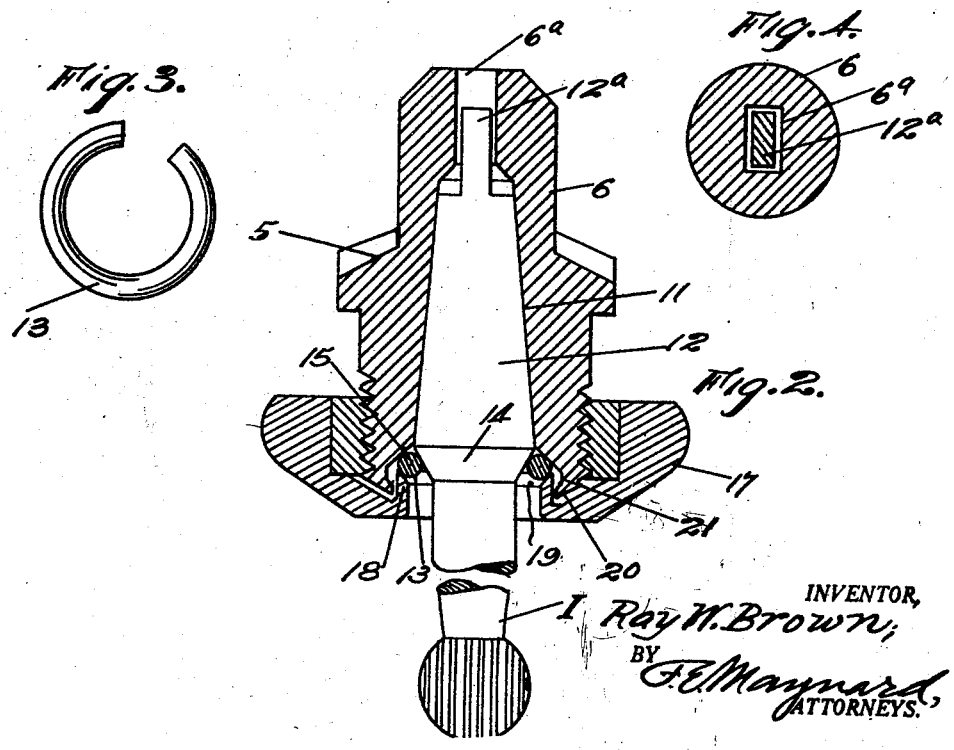
INVENTOR,
Ray W. Brown,
BY F. E. Maynard
ATTORNEYS.

Patented July 21, 1931

1,815,611

UNITED STATES PATENT OFFICE

RAY W. BROWN, OF ALTADENA, CALIFORNIA, ASSIGNOR, BY MESNE ASSIGNMENTS, TO HENRY DALZELL WILSON, OF PITTSBURGH, PENNSYLVANIA

NONJAMMING TAPER SHANK TOOL

Application filed January 30, 1929. Serial No. 336,316.

This invention relates to mechanical appliances and more especially to detachable tool members and complementary sockets therefor.

In my previous application Ser. No. 311,504 filed Oct. 10, 1928, there is shown a tool member having a shank with a conical, non-sticking body to be interlocked against rotation and against end play in a socket including a contractive spring ring with means for closing and for relieving the ring.

The present invention has for an object to provide a split ring clamp and a retainer therefor which will catch the expanded ring after the contracting means has relieved the ring to the desired extent and in event of the inadvertent total removal of the contracting means.

Other objects, advantages and details of the structure, the combination and the mode of operation will be made manifest in the ensuing description of the herewith illustrative embodiment; it being understood that modifications, variations and adaptations may be resorted to within the scope, spirit and principle of the invention; and within the letter thereof as it is hereinafter claimed.

Figure 1 is a side elevation of a dental tool in which the invention is incorporated.

Figure 2 is a detail sectional view (enlarged scale) of the driven assembly.

Figure 3 is a plan of the detached clamp ring.

Figure 4 is a section across the tang socket.

While the invention is here shown as adapted to a dental handpiece it is to be understood that it may be incorporated in sundry combinations where it is desirable to detachably retain a shanked implement in a respective socket part.

The tool as shown is combined with a shell 2 having a lateral hub 3 for a drive gear shaft 4 from which power is transmitted to a gear 5 which is rigid with a running barrel 6.

The barrel is journaled in the shell between an adjustable, top, thrust cap 7 and a bottom bushing 10 screwed into the shell 2; these features being fully disclosed in the aforesaid application.

The driven barrel 6 has a socket or bore 11 for the reception of the shank 12 of an implement I, here shown as a dental burr.

The shape of the shank 12 and its socket 11 is of such form or conical angle as to eliminate any possibility of the jamming or freezing of the shank in the socket and therefore obviating the need of any inherent or extraneous ejecting means when the implement is to be detached from the socket.

Preferably the socket and the shank are of conical form so that the shank can be firmly seated without side play and will set true on the axis of the tool for high degree of precision in action.

Means are provided to quickly and solidly seat the inserted shank and hold it in place without relative motion to the barrel. As here shown this means is in the form of a split clamp ring 13 which has an inner diameter, when free, slightly greater than that of a complementary shoulder 14 of the shank 12. This shoulder registers with a reverse angle shoulder 15 in the bottom of the barrel 6 and which forms an abutment for the ring 13.

The ring is adapted to be quickly contracted to jam up and inward on the shoulder 14 of the inserted shank and this is accomplished by a collar 17 threaded onto a barrel 6 and having an internal, cylindrical rim-like wall 18 through which the maximum diameter of the shank 12 may pass. The rim of this wall 18 has a conical, inner face 19 which is of such diameter that it will engage or pick the split ring 13 when this is in expanded position and rests on a retaining lip 20 which is inturned under the abutment shoulder 15, of the barrel 6, and presents a concave, annular seat 21 into which the ring 13 slips as it expands on the shoulder 15.

The wall 18 of the contracting collar 17 moves up past the lip 20 and catches on the outer, lower surface of the expanded ring 13 and, by further screwing upward of the collar 17, the ring is crowded up and inward on the shoulder 15 until the ring clamps on the shoulder 14 of the inserted shank 12 and this is thrust solidly to its seat in the conical bore 11 of the barrel.

Any appropriate rotary drive connection may be employed to interlock the shank 12 and the barrel for rotation. As here shown the shank 12 has a flat tang part or head 12$^a$ complementary to a drive socket part 6$^a$.

It will be seen from the above that it is only necessary to run back the contracting collar 17 to allow the clamp spring 13 to open and admit of insertion of the implement shank 12. Should the collar run off the barrel the spring 13 expands against and catches on the barrel lip 20 and takes a position on the seat 21 from which it can be readily picked up by the collar as it is again run up.

What is claimed is:

A socket member having a conical internal seat bore and having an inturned lip and an opposed abutment shoulder forming an annular seat groove, an expansive split ring resting in the said groove when free and inwardly overhanging the lip, a shank part insertible through the ring to seat in said bore and having a conical shoulder opposed to the abutment shoulder and of reverse angle relative thereto, and means adjustable on said socket member to engage the ring and contract it from the groove and close it onto the shank shoulder and upward on the socket shoulder whereby to press the shank to its seat in the socket and hold it in place.

RAY W. BROWN.